US009995421B2

(12) United States Patent
Quartarone et al.

(10) Patent No.: US 9,995,421 B2
(45) Date of Patent: Jun. 12, 2018

(54) VIBRATION DAMPER FOR VACUUM PUMPS

(71) Applicant: AGILENT TECHNOLOGIES, INC., Loveland, CO (US)

(72) Inventors: Carmelo Quartarone, Turin (IT); Luca Bonmassar, Turin (IT); Silvio Giors, Turin (IT); Vincenzo Pandolfo, Turin (IT)

(73) Assignee: Agilent Technologies, Inc., Santa Clara, CA (US)

( * ) Notice: Subject to any disclaimer, the term of this patent is extended or adjusted under 35 U.S.C. 154(b) by 1113 days.

(21) Appl. No.: 14/228,137

(22) Filed: Mar. 27, 2014

(65) Prior Publication Data

US 2014/0197627 A1 Jul. 17, 2014

Related U.S. Application Data

(63) Continuation of application No. 13/072,997, filed on Mar. 28, 2011, now Pat. No. 8,794,678.

(30) Foreign Application Priority Data

Apr. 16, 2010 (IT) .............................. TO2010A0313

(51) Int. Cl.
    *F16L 55/02* (2006.01)
    *F04D 19/04* (2006.01)
    (Continued)

(52) U.S. Cl.
    CPC ............ *F16L 55/02* (2013.01); *F04D 19/042* (2013.01); *F04D 29/668* (2013.01); *F16F 1/3732* (2013.01); *F16L 25/12* (2013.01)

(58) Field of Classification Search
    CPC ......... F16L 55/02; F16L 25/12; F04D 19/042; F04D 29/668; F16F 1/3732
    (Continued)

(56) References Cited

U.S. PATENT DOCUMENTS 3,189,372 A 6/1965 Dunmire
3,517,951 A 6/1970 Dunmire
(Continued)

FOREIGN PATENT DOCUMENTS

DE 102004044775 A1 6/2006
EP 1533530 A1 5/2005
(Continued)

OTHER PUBLICATIONS

Machine translation of JP2003003988.
(Continued)

*Primary Examiner* — James M Hewitt, II

(57) ABSTRACT

In a vibration damper of a turbomolecular vacuum pump, a vacuum tightness function and a vibration damping function are both performed by one ore more toroidal rings made of an elastic material. The elastic rings assume a resting configuration while the vacuum pump is not operating and the damper is at atmospheric pressure, and they assume a compressed configuration while the vacuum pump is operating and the damper is under vacuum conditions. In the compressed configuration, the elastic rings are deformed due to a compression force. This deformation of the elastic rings prevents metal-to-metal contact between the vacuum pump and a vacuum chamber to which the pump is connected through the damper.

16 Claims, 9 Drawing Sheets

(51) Int. Cl.
*F04D 29/66* (2006.01)
*F16F 1/373* (2006.01)
*F16L 25/12* (2006.01)

(58) Field of Classification Search
USPC ....... 285/66, 360–361, 376–377, 98–99, 336
See application file for complete search history.

(56) References Cited

U.S. PATENT DOCUMENTS

| | | | |
|---|---|---|---|
| 4,036,512 | A | 7/1977 | Francis |
| 4,332,404 | A | 6/1982 | Huffman |
| 5,516,122 | A | 5/1996 | Caffee |
| 8,961,106 | B2 * | 2/2015 | Hamochi .............. F04D 19/042 415/119 |
| 2003/0007862 | A1 | 1/2003 | Ohtachi et al. |
| 2008/0226387 | A1 | 9/2008 | Namiki |

FOREIGN PATENT DOCUMENTS

| | | |
|---|---|---|
| EP | 1715190 A1 | 10/2006 |
| EP | 2410184 B1 | 5/2013 |
| GB | 454969 | 10/1936 |
| GB | 1260932 | 1/1972 |
| JP | 2003003988 | 1/2003 |
| JP | WO2008111335 A1 | 9/2008 |
| WO | 2005095798 A1 | 10/2005 |

OTHER PUBLICATIONS

Office Action dated Jan. 8, 2015 in Japanese Patent Application No. 2011-045140 (Unofficial/Non-certified translation provided by foreign agent included).

Harris, Nigel; Vacuum system components and valves; Modem Vacuum Practice, Third Edit ion, 2007, pp. 288-289.

ISO Flanges and Clamps; Instruction Manual; Edwards Limited 2008; Issue D.

Summons to attend oral proceedings pursuant to Rule 115(1) EPC dated Jun. 10, 2015 from related European Application No. 11155766.6.

* cited by examiner

VIBRATION DAMPER FOR VACUUM PUMPS

CROSS-REFERENCE TO RELATED APPLICATIONS

This application is a continuation under 37 C.F.R. § 1.53(b) of U.S. patent application Ser. No. 13/072,997 filed on Mar. 28, 2011 now U.S. Pat. No. 8,794,678, which claims the benefit of Italian Patent Application No. TO2010.A000313 filed on Apr. 16, 2010. The respective disclosures of U.S. patent application Ser. No. 13/072,997 and Italian Patent Application No. TO2010A000313 are hereby incorporated by reference in their entirety.

BACKGROUND

A turbomolecular vacuum pump can be used to establish vacuum conditions in a vacuum chamber. In certain contexts, the vacuum chamber or its contents can be extremely sensitive to vibrations caused by a pump rotor of the vacuum pump. For instance, the vacuum chamber can be extremely sensitive to vibrations when used in the manufacture of electron microscopes or in the testing and repair of masks for the manufacture of integrated electronic circuits.

To reduce transmission of mechanical vibrations from the vacuum pump to the vacuum chamber, vacuum pumps are generally equipped with a vibration damper interposed between the vacuum pump and the vacuum chamber.

In certain conventional structures, a vibration damper has a first flange for connection to the vacuum chamber, a second flange for connection to the vacuum pump, a flexible bellows made of steel for ensuring vacuum tightness and structural resistance of the damper to torsion, and one or more components made of rubber and arranged around the bellows to ensure damping of the vibrations generated by the vacuum pump. Such dampers can generally attain damping factors on the order of 10 to 100, which can be insufficient for applications demanding higher precision.

To improve the damping factor and to obtain an effective vibration damping at several frequencies, two dampers can be used in series. The two dampers can be connected by an annular member of considerable mass, such as a steel annular member. The arrangement of the mass between the two dampers allows a vibration damping system to be modeled as a two-pole transfer function and enables effective vibration damping at different frequencies. For instance, it is possible to obtain vibration damping both at a rotation frequency of the pump rotor and at a rotation frequency of a cage of bearings on which a rotation axis of the vacuum pump is mounted. The double damper can also increase the damping factor of the vacuum pump up to values on the order of $10^3$.

These double dampers, however, have various drawbacks. For instance, in both single and the double dampers, using different members to ensure vacuum tightness (the bellows) and to achieve vibration damping and ensure structural rigidity (the rubber member(s)) entails a high number of components and, consequently, considerable production costs and high risks of breaking or malfunction. Moreover, although the single dampers give an unsatisfactory damping factor, the double dampers tend to have large axial sizes, making them unsuitable for applications requiring compactness. Moreover, low conductance resulting from a large axial size can reduce the actual pumping speed of the pump/damper system.

SUMMARY

The disclosed embodiments relate generally to vibration dampers for vacuum pumps. Certain embodiments are designed to provide an improved damping factor and conductance while maintaining a reasonable axial size, reliability, and cost.

In one embodiment, a vibration damper is disposed between a vacuum pump and a vacuum chamber. The vibrtration damper comprises a first cylindrical hollow component, a second cylindrical hollow component, and a toroidal ring comprising an elastic material. The first cylindrical hollow component is arranged about an axis of symmetry and comprises a first end configured to be coupled to the vacuum pump, a second end located opposite the first end, a first toroidal semi-seat located at the second end, and a connecting component suitable for axially binding the first cylindrical hollow component to the second cylindrical hollow component. The second cylindrical hollow component is arranged about the axis of symmetry at an axial distance from the first cylindrical hollow component and has a first end configured to be coupled to the vacuum chamber, a second end located opposite the first end, a toroidal semi-seat, and a connecting component suitable for axially binding the second cylindrical hollow component to the first cylindrical hollow component. The toroidal ring comprises an elastic material and is arranged between the first cylindrical hollow component and the second cylindrical hollow component. The toroidal ring assumes a resting configuration in response to a compression force directed along the axis of symmetry with a magnitude lower than a predetermined threshold, and assumes a compressed configuration in response to a compression force directed along the symmetry axis with a magnitude greater than the predetermined threshold, the resting configuration forming an axial connection between the first and the second cylindrical hollow components, and the compressed configuration forming a vacuum-tight axial connection between the first and the second component and preventing contact between the connecting components of the first cylindrical hollow component and the second cylindrical hollow component.

BRIEF DESCRIPTION OF THE DRAWINGS

The drawings illustrate selected embodiments as described in the detailed description. Features in the drawings are not necessarily drawn to scale, and some dimensions may be intentionally increased or decreased for clarity of discussion. Where practical, like reference numbers refer to like features.

FIG. IF is an enlarged detail of a cross-sectional view of a vibration damper according to an alternative variant of the first embodiment, showing the vibration damper under vacuum conditions.

Figure 2:
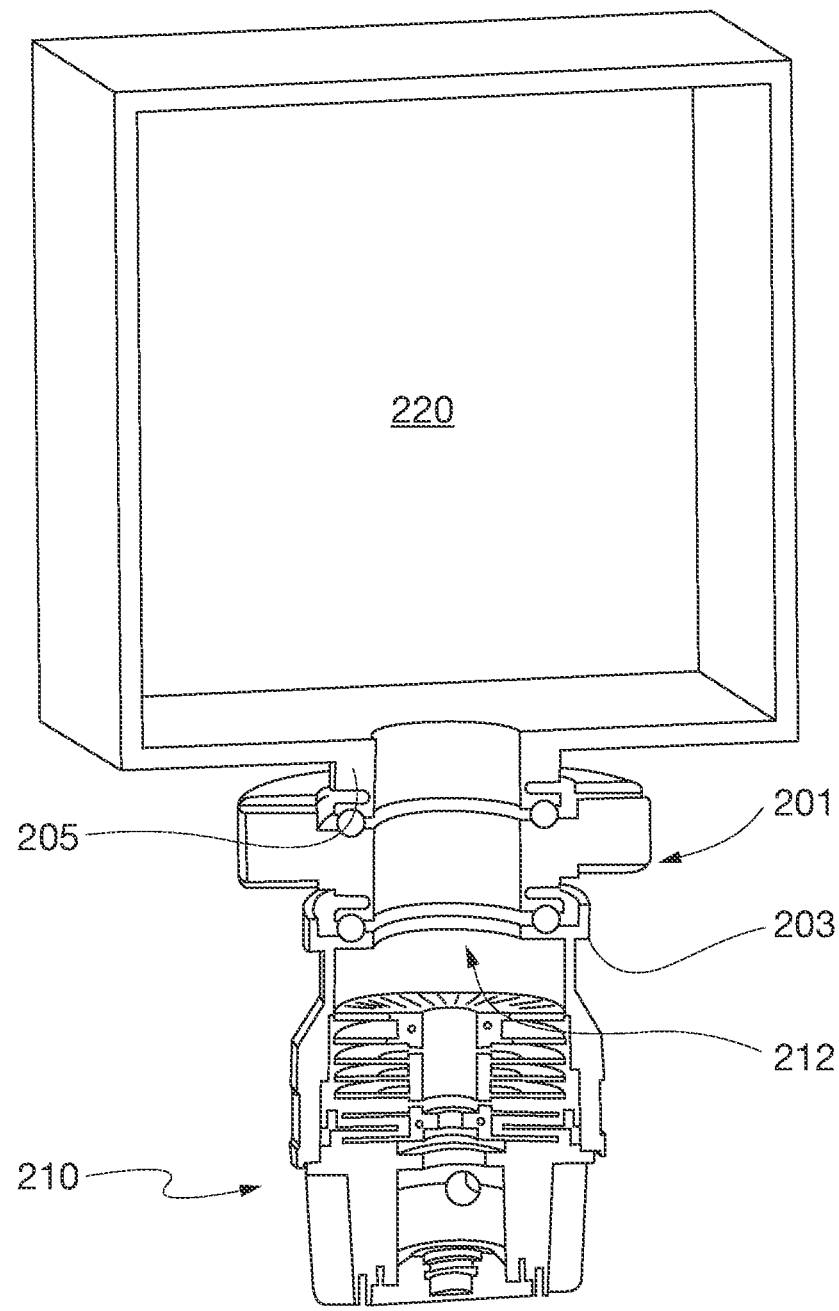

FIG. 2 is a cross-sectional view of a vibration damper according to a second embodiment.

Figure 3:
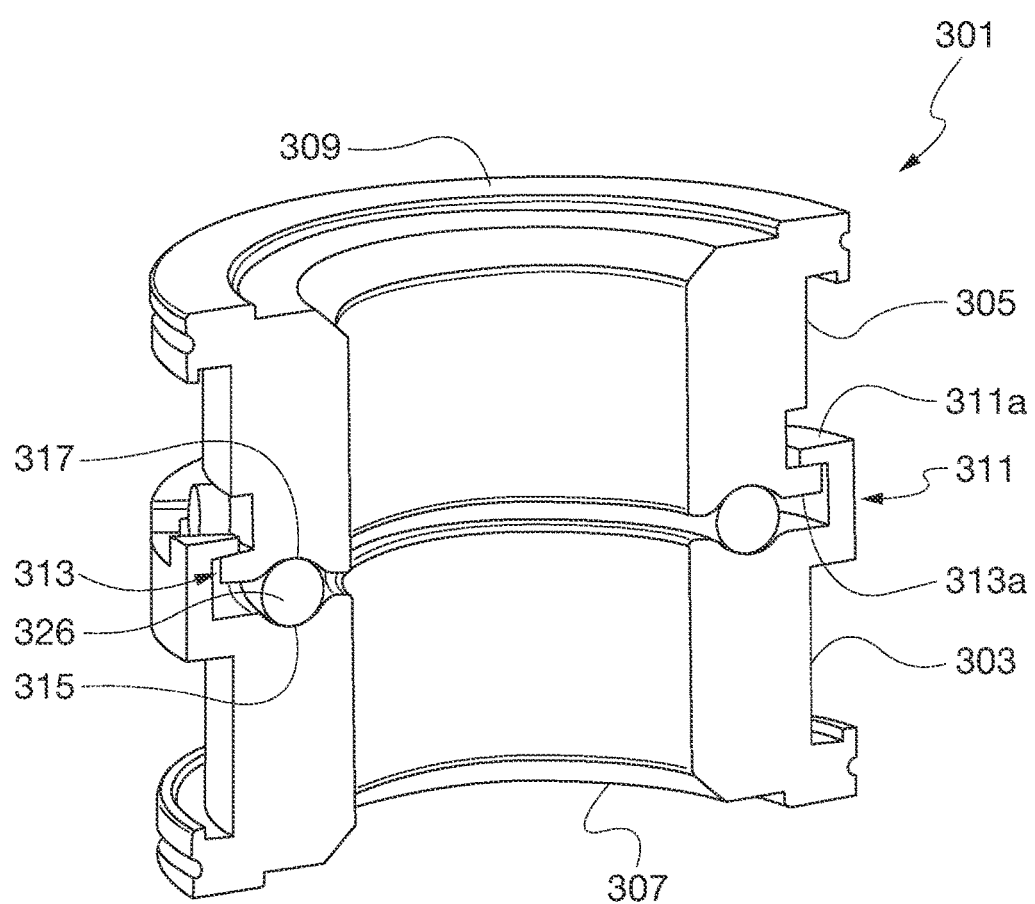

FIG. 3 is a cross-sectional view of a vibration damper according to a third embodiment.

Figure 4:
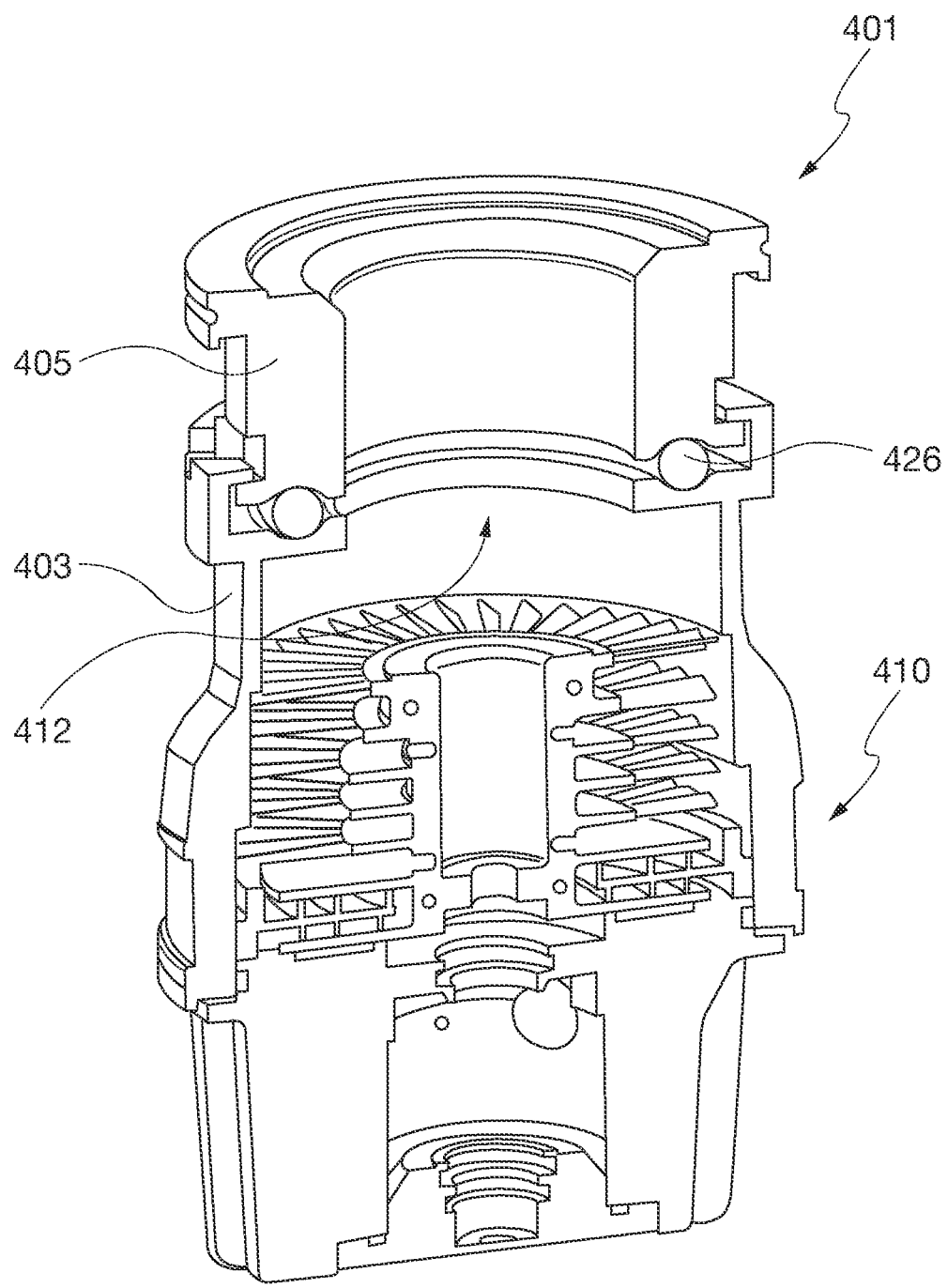

FIG. 4 is a cross-sectional view of a vibration damper according to a fourth embodiment.

Figure 5:
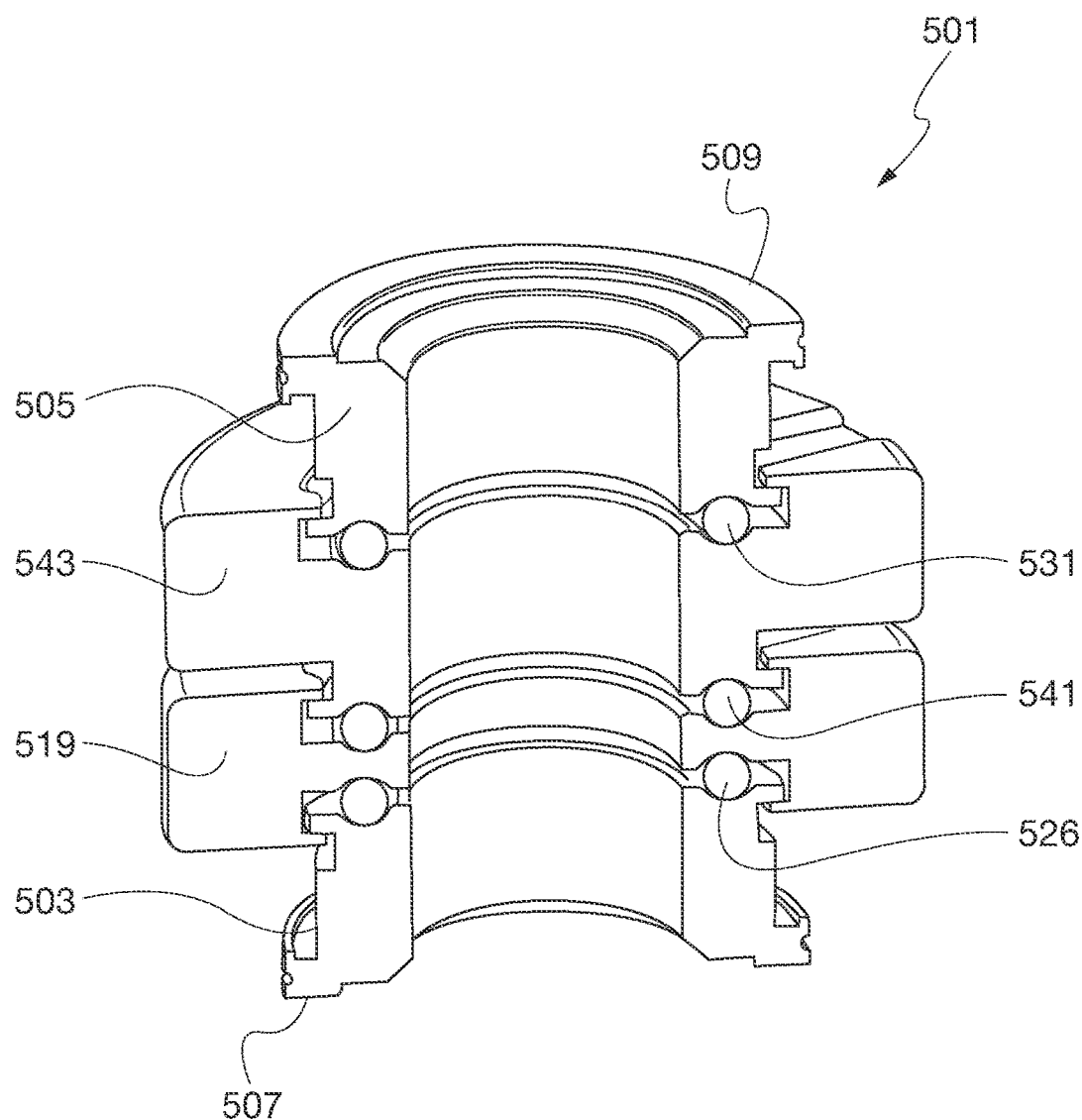

FIG. 5 is a cross-sectional view of a vibration damper according to a fifth embodiment.

DETAILED DESCRIPTION

Selected embodiments are described below with reference to the corresponding drawings. These embodiments are presented as teaching examples and should not be construed to limit the scope of the claimed subject matter.

Some embodiments relate to a vibration damper for turbomolecular vacuum pumps. The vibration damper can prevent vibrations generated by the rotation of a rotor of a vacuum pump from being transmitted to a vacuum chamber where vacuum conditions are to be established. Some embodiments provide a vibration damper that has satisfactory damping, a limited number of components that can be readily manufactured, a relatively small axial size, and adequate conductance.

FIGS. 1A through 1E illustrate a vibration damper 101 according to a first embodiment.

Figure 1A:
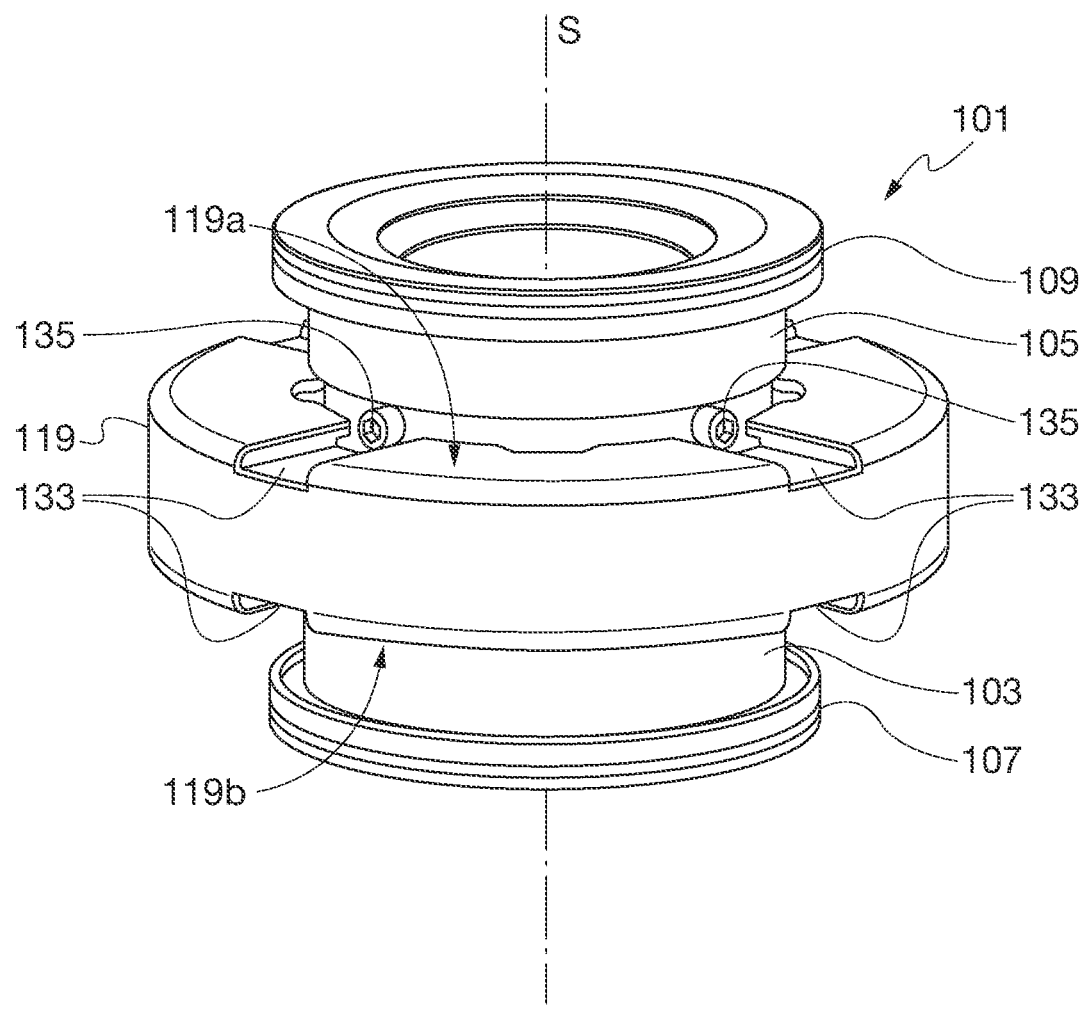
FIG. 1A is a perspective view of a vibration damper according to a first embodiment.
Figure 1B:
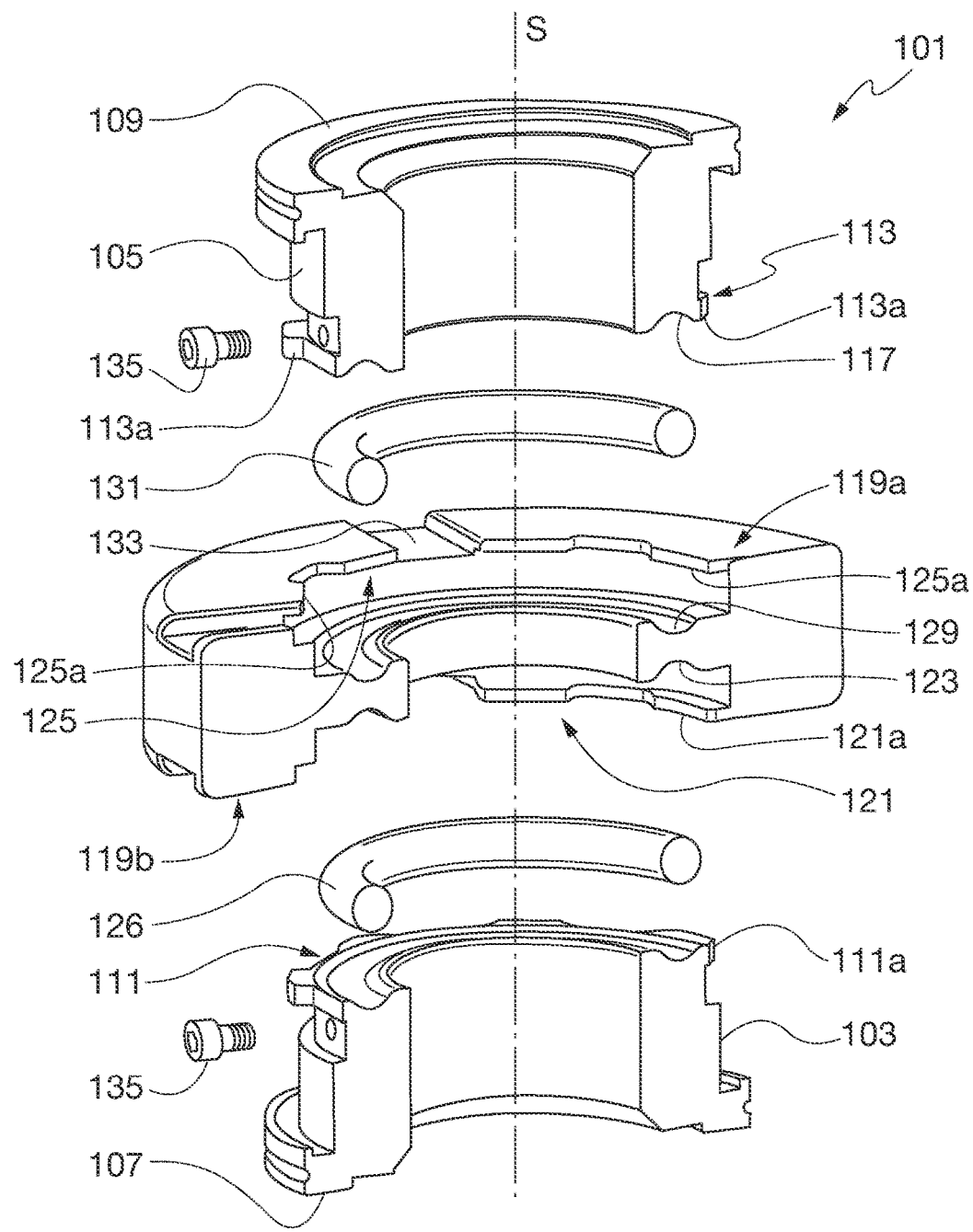
FIG. 1B is an exploded perspective view of a section of the vibration damper shown in FIG. 1A.

Referring to FIGS. 1A and 1B, vibration damper 101 comprises a first cylindrical hollow component ("first component") 103, which can made of metal, and a second cylindrical hollow component ("second component") 105, which can be made of metal. First and second components 103 and 105 are axially aligned along an axis of symmetry S.

First component 103 has a flange 107 for connection to a connection flange of a vacuum pump at one end, and connecting component 111 at an opposite end. Connecting component 111 comprises radial teeth 111a that extend radially outwards from an external wall of first component 103 and are equally spaced along a circumference of the external wall.

Similarly, second component 105 has a flange 109 for connection to a connection flange of a vacuum chamber at one end, and connecting component 113 at an opposite end. Connecting component 113 comprise radial teeth 113a that extend radially outward from the external wall of second component 105 and are equally spaced along the circumference of the external wall.

First component 103 further comprises a toroidal semi-seat 115 at the end where connecting component 111 are formed. Similarly, second component 105 further comprises a toroidal semi-seat 117 at the end where connecting component 113 are formed.

Vibration damper 101 further comprises a cylindrical hollow intermediate component ("intermediate component") 119, which can be made of metal and is aligned along axis of symmetry S. Intermediate component 119 has considerable mass compared with first and second components 103 and 105, and is often made of steel or a similar material.

Intermediate component 119 has, at a first end, connecting component 121 arranged to be coupled with connecting component 111 of first component 103 for connecting first component 103 to intermediate component 119. Connecting component 121 comprises radial teeth 121a that extend radially inwards from an internal wall of intermediate component 119 and are equally spaced along a circumference of the internal wall.

A toroidal semi-seat 123 is formed on a wall turned towards the first end equipped with connecting component 121. First component 103 and intermediate component 119 are configured such that toroidal semi-seats 115 and 123 form a toroidal seat where first component 103 and intermediate component 119 are connected. The toroidal seat receives a first toroidal ring 126 made of an elastic material, which can be an elastomer.

Intermediate component 119 has, at an opposite end, connecting component 125 arranged to be coupled with connecting component 113 of second component 105 for connecting second component 105 to intermediate component 119. Connecting component 125 comprise radial teeth 125a that extend radially inwards from the internal wall of intermediate component 119 and are equally spaced along the circumference of the internal wall.

A toroidal semi-seat 129 is formed on a wall turned towards the opposite end of intermediate component 119. Second component 105 and intermediate component 119 are configured such that toroidal semi-seats 117 and 129 form a toroidal seat where second component 105 and intermediate component 119 are connected. The toroidal seat receives a second toroidal ring 131 made of an elastic material.

Figure 1C:
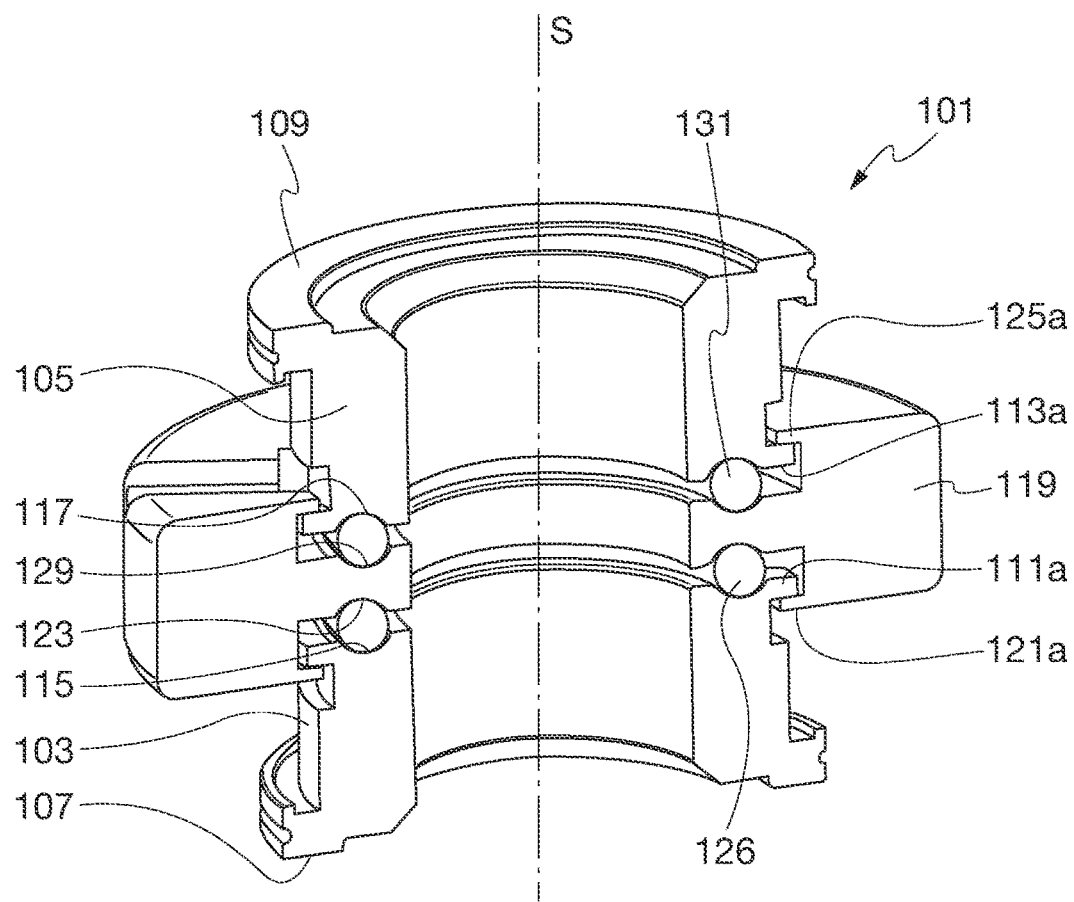
FIG. 1C is a cross-sectional view of the vibration damper shown in FIG. 1A.

Referring to FIG. 1C, first component 103 and intermediate component 119 are connected by a bayonet insertion with radial teeth 111a of first component 103 offset relative to radial teeth 121a of intermediate component 119 and a subsequent rotation of the components relative to axis S. This connection mutually aligns radial teeth 111a and 121a so they abut against one another and retain first component 103 and intermediate component 119 relative to each other. At this point, first toroidal ring 126 is housed and confined within the toroidal seat resulting from the combination of toroidal semi-seats 115, 123 and is subjected to a minimum compression lower than a predetermined threshold so as to provide tightness in order to enable evacuation of the vacuum system.

Similarly, second component 105 and intermediate component 119 are connected through a bayonet insertion with radial teeth 113a of second component 105 offset relative to radial teeth 125 of intermediate component 119 and subsequent rotation of the components relative to axis S. This connection mutually aligns radial teeth 113a and 125a such that they abut against one another and retain second component 105 and intermediate component 119 relative to each other. At this point, second toroidal ring 131 is housed and confined within the toroidal seat resulting from the combination of toroidal semi-seats 117, 129 and is subjected to a minimum compression lower than predetermined threshold, similar to component 126.

Vibration damper 101 can further comprise features for preventing subsequent unintentional and undesired relative rotation that could compromise the connection of first and second components 103 and 105 with intermediate component 119, thereby compromising the vacuum integrity and the mechanical safety of the system.

To this end, radial recesses 133 are formed on faces 119a and 119b at both ends of intermediate component 119 and, in correspondence of the recesses, pins 135 are secured on first and second components 103 and 105, which pins project from the components and extend into the recesses. In response to an undesired rotation, for instance due to the rapid shutdown torque of the vacuum pump, pins 135 abut against the walls of radial recesses 133 to prevent further rotation.

Figure 1D:
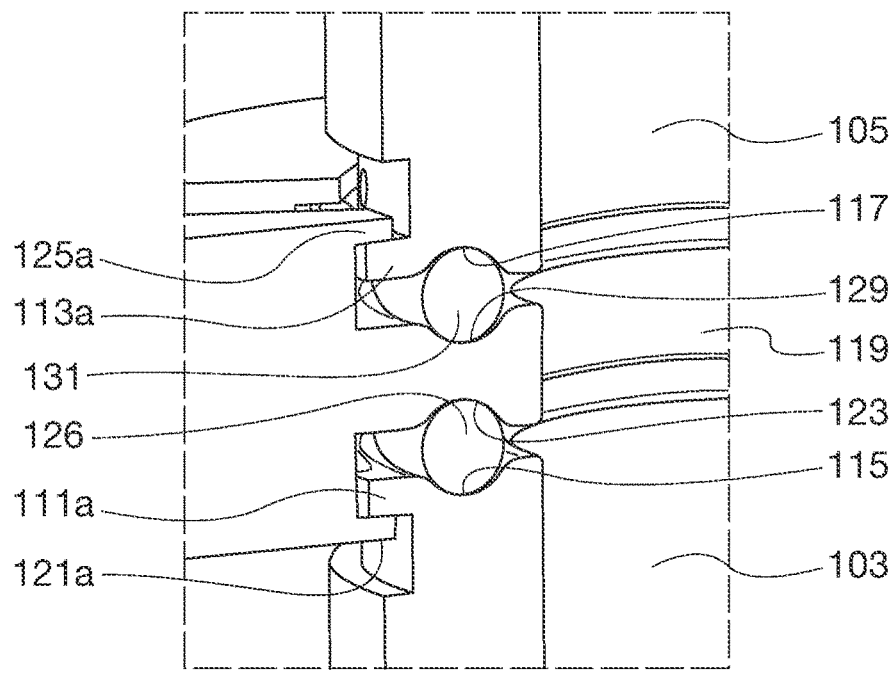
FIG. 1D is an enlarged detail of FIG. 1C showing the vibration damper under atmospheric pressure conditions.
Figure 1E:
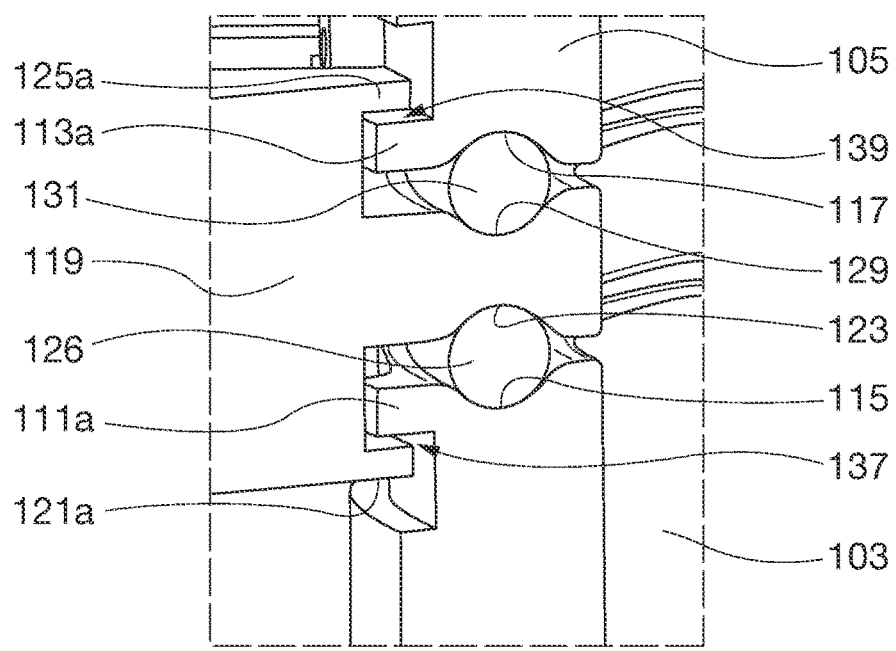
FIG. 1E is an enlarged detail of FIG. 1C showing the vibration damper under vacuum conditions.
Figure 1F:
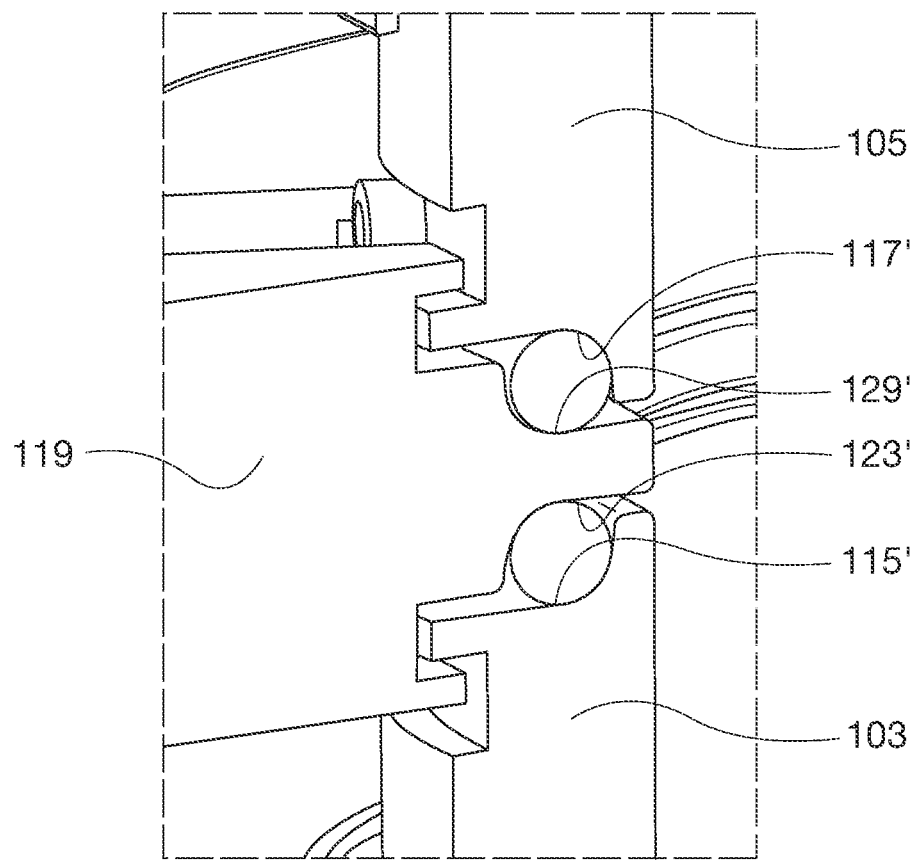

Referring to FIGS. 1D and 1E, under atmospheric pressure conditions, toroidal rings 126 and 131 are confined in respective toroidal semi-seats 115 and 123, and 117 and 129 and are in a resting configuration, since they are subjected to a compression force lower than the predetermined threshold (FIG. 1D).

Under such conditions, radial teeth 111a of first component 103 axially abut against radial teeth 121a of intermediate component 119, and radial teeth 113a of second component 105 abut against radial teeth 125 of intermediate component 119. In this way, the teeth maintain first component 103, intermediate component 119 and second component 105 together and slightly pre-compress toroidal rings 126 and 131.

Once a vacuum is created, toroidal rings 126 and 131 are subjected to a compression force higher than the predetermined threshold and they become deformed from the resting configuration to a compressed configuration (FIG. 1E).

Under such conditions, because of the deformation of toroidal rings 126 and 131, radial teeth 111a of first component 103 are no longer in contact with radial teeth 121a of intermediate component 119 and a gap 137 is created between them. Similarly, a gap 139 is created between radial teeth 113a of second component 105 and radial teeth 125 of intermediate component 119.

Consequently, while the vacuum pump is operating and mechanical vibrations are generated by the rotation of the rotor of the pump, first component 103 and intermediate component 119 are in contact only through first toroidal ring 126, and second component 105 and intermediate component 119 are in contact only through second toroidal ring 131, with toroidal rings 126 and 131 ensuring vacuum tightness and vibration damping.

In the embodiment of FIG. 1, the toroidal semi-seats have a substantially semi-circular profile so that once coupled, they create a toroidal seat with substantially circular cross-section for the toroidal rings 126, 131. In other embodiments, different profiles and shapes can be chosen for the semi-seats, provided that proper deformation of the toroidal rings 126, 131 is present. For instance, referring to FIG. 1F, it is possible to make the toroidal semi-seats with a substantially L-shaped profile and to arrange them in mirroring configuration opposite each other.

Due to the absence of any metal-to-metal contact, a relatively high damping factor in the range $10^3$ to $10^4$ can be achieved and vibrations generated by the rotation of the rotor of the pump can be effectively attenuated by such a factor.

The absence of any metal-to-metal contact can also provide electrical insulation of vibration damper 101 and, consequently, electrical insulation of the vacuum chamber from the vacuum pump, which can be beneficial in many applications, such as electron microscopy. By contrast, in conventional dampers where the bellows are made of metal for structural reasons, the vacuum chamber is not electrically insulated from the vacuum pump.

FIG. 2 illustrates vibration damper 201 according to another embodiment.

In the embodiment of FIG. 2, a first component 203 of vibration damper 201, instead of being equipped with a component for connection to a vacuum pump, is directly integrated with a turbomolecular vacuum pump 210 in correspondence of a suction port 212. Similarly, a second component 205 of vibration damper 201, instead of being equipped with a component for connection to a vacuum chamber, is directly integrated with a vacuum chamber 220.

In other words, the connection flange of turbomolecular vacuum pump 210 in correspondence of suction port 212 is shaped and structured so as to act as the first component of vibration damper 201, and the connection flange of vacuum chamber 220 is shaped and structured so as to act as the second component of the vibration damper 201.

Vibration damper 201 can provide a further reduction of the overall axial size.

FIG. 3 illustrates a vibration damper 301 according to another embodiment. The embodiment of FIG. 3 is relatively simple in that it includes a single elastic ring.

In the embodiment of FIG. 3, a first component 303 of vibration damper 301 has at one end a flange 307 for connection to a flange of a vacuum pump and, at an opposite end, a first toroidal semi-seat 315 for a toroidal ring 326 of elastic material and connecting component 311 for connection to a second component 305 of vibration damper 301. Connecting component 311 comprises radial teeth 311a that extend radially inwards from an internal surface of first component 303. Similarly, second component 305 of vibration damper 301 has at one end a flange 309 for connection to the flange of a vacuum chamber and, at an opposite end, a second toroidal semi-seat 317 for toroidal ring 326 of elastic material and connecting component 313 for connection to first component 303 of vibration damper 301. Connecting component 313 comprises radial teeth 313a that extend radially outwards from an external surface of second component 305.

First and second components 303 and 305 of vibration damper 301 are directly connected to each other without the interposition of any intermediate component, and a single toroidal ring 326 of elastic material is provided. Toroidal ring 326 is housed and confined in the toroidal housing resulting from the combination of toroidal semi-seats 315 and 317.

The operation of vibration damper 301 is similar to what has been described above in connection with FIG. 1.

The absence of the intermediate components and the provision of a single elastic toroidal ring do not allow obtaining a two-pole transfer function. Nevertheless, vibration damper 301 can achieve a damping factor greater than or equal to that of a conventional single damper. In addition, vibration damper 301 can achieve electrical insulation of the vacuum chamber from the vacuum pump and a reduced axial size.

FIG. 4 illustrates a vibration damper 401 according to another embodiment.

In the embodiment of FIG. 4, a single elastic toroidal ring 426 is provided and a first component 403 of vibration damper 401 is directly connected to a second component 405 of vibration damper 401, without the interposition of any intermediate component. However, in this embodiment, first component 403, instead of being equipped with a component for connection to a vacuum pump, is directly integrated with a turbomolecular vacuum pump 410 in connection with a suction port 412.

In other words, connection flange of turbomolecular vacuum pump 410 is shaped and structured so as to act as first component 403 of vibration damper 401. This feature can allow a further reduction of the overall axial size of vibration damper 401.

FIG. 5 illustrates a vibration damper 501 according to another embodiment.

The embodiment of FIG. 5 comprises a further intermediate component between first and second components 503 and 505 of vibration damper 501 and, correspondingly, a further toroidal ring of elastic material. Thus, vibration damper 501 comprises first component 503 equipped with a flange 507 for connection to a vacuum pump, and a second component 505 equipped with a flange 509 for connection to a vacuum chamber.

First component 503 is connected to a first intermediate component 519 through a connecting component similar to those described previously and with the interposition of a first elastic toroidal ring 526 housed and confined in a toroidal housing resulting from the combination of toroidal semi-seats formed in the first component and the first intermediate component.

First intermediate component 519 is connected to a second intermediate component 543 through a connecting component similar to those previously described and with the interposition of a second elastic toroidal ring 541, which is housed and confined in a toroidal housing resulting from the combination of toroidal semi-seats formed in the first and second intermediate components 519 and 543.

Second intermediate component 543 is connected to second component 505 through a connecting component similar to those described previously and with the interposition of a third elastic toroidal ring 531 housed and confined in a toroidal housing resulting from the combination of toroidal semi-seats formed in second intermediate component 543 and second component 505.

In other embodiments, other numbers of intermediate components can be inserted between first and second components of a vibration damper. In general, increasing the number of intermediate components tends to increase the number of frequencies at which an effective damping of the vibrations generated by the vacuum pump can be obtained. It also tends to increase the overall axial size of the vibration damper.

As indicated by the foregoing, certain embodiments can provide a vibration damper for vacuum pumps that is simple and compact, easy and cheap to be manufactured, and capable of ensuring a damping factor on the order of $10^3$ to $10^4$.

The foregoing is illustrative of embodiments and is not to be construed as limiting thereof. Although a few embodiments have been described, those skilled in the art will readily appreciate that many modifications are possible in the embodiments without materially departing from the novel teachings and benefits disclosed herein.

What is claimed is:

1. An apparatus, comprising:
   a vibration damper comprising an elastic material and being arranged between a vacuum pump and a vacuum chamber, said elastic material bridging a space between adjacent coupling components associated respectively with the vacuum pump and the vacuum chamber, wherein the vibration damper assumes a resting configuration in response to a compression force with a magnitude lower than a predetermined threshold, and assumes a compressed configuration in response to a compression force with a magnitude greater than the predetermined threshold, the resting configuration forming a connection between the vacuum pump and the vacuum chamber, and the compressed configuration forming a vacuum-tight connection between the vacuum pump and the vacuum chamber, and the compressed configuration having at least one gap preventing connection between the vacuum pump and the vacuum chamber except by the elastic material, the elastic material comprising a toroidal seal seated in a semi-toroidal seat of a flange comprising at least one of the adjacent coupling components.

2. The apparatus of claim 1, wherein the vibration damper comprises:
   a first cylindrical hollow component arranged about an axis of symmetry and comprising a first end configured to be coupled to the vacuum pump, a second end located opposite the first end, a first toroidal semi-seat located at the second end, and a connecting component suitable for axially binding the first cylindrical hollow component to a second cylindrical hollow component;
   the second cylindrical hollow component, arranged about the axis of symmetry at an axial distance from the first cylindrical hollow component and having a first end configured to be coupled to a vacuum chamber, a second end located opposite the first end, a second toroidal semi-seat, and a connecting component suitable for axially binding the second cylindrical hollow component to the first cylindrical hollow component;
   a toroidal ring comprising the elastic material of the toroidal seal and arranged between the first cylindrical hollow component and the second cylindrical hollow component, wherein the toroidal ring assumes a resting configuration in response to a compression force directed along the axis of symmetry with a magnitude lower than a predetermined threshold, and assumes a compressed configuration in response to a compression force directed along the symmetry axis with a magnitude greater than the predetermined threshold, the resting configuration forming an axial connection between the first and the second cylindrical hollow components, and the compressed configuration forming a vacuum-tight axial connection between the first cylindrical hollow component and the second cylindrical hollow component and preventing contact between the connecting components of the first cylindrical hollow component and the second cylindrical hollow component.

3. The apparatus of claim 2, wherein the elastic toroidal ring is arranged between the first and second cylindrical hollow components such that the first toroidal semi-seat of the first cylindrical hollow component and the second toroidal semi-seat of the second cylindrical hollow component define a toroidal seat in which the toroidal ring is received and confined.

4. The apparatus of claim 3, wherein the connecting component of the first cylindrical hollow component comprises radial teeth substantially equally spaced along a surface of the first cylindrical hollow component, and the connecting component of the second cylindrical hollow component comprises radial teeth substantially equally spaced along a surface of the second cylindrical hollow component and suitable for engaging the radial teeth of the connecting component of the first cylindrical hollow component.

5. The apparatus of claim 4, further comprising a component for preventing accidental rotation of the first cylindrical hollow component with respect to the second cylindrical hollow component.

6. The apparatus of claim 1, wherein the vibration damper comprises:
   a first cylindrical hollow component;
   a second cylindrical hollow component; and
   the apparatus further comprising at least one intermediate component and an additional toroidal ring made of an elastic material arranged between the first and the second cylindrical hollow components.

7. The apparatus of claim 6, wherein the at least one intermediate component comprises:
   a first toroidal semi-seat oriented towards a first end of the intermediate component and configured to jointly contain a first toroidal ring comprising the elastic material of the toroidal seal with a semi-toroidal seat of another intermediate component or with a semi-toroidal seat of the first cylindrical hollow component; and a second toroidal semi-seat oriented towards a second end of the intermediate component and configured to jointly contain a second toroidal ring with a semi-toroidal seat of another intermediate component or with a semi-toroidal seat of the second cylindrical hollow component.

8. The apparatus of claim 6, wherein the first cylindrical hollow component comprises a first connecting component configured for connection to the at least one intermediate component and comprising radial teeth substantially equally spaced along a surface of the first cylindrical hollow component;

wherein the second cylindrical hollow component comprises a second connecting component configured for connection to the at least one intermediate component and comprising radial teeth substantially equally spaced along a surface of the second cylindrical hollow component; and wherein the at least one intermediate component comprises, at a first end, a first connecting component comprising radial teeth substantially equally spaced along a surface of the at least one intermediate component and suitable for engaging radial teeth of the first cylindrical hollow component or of another intermediate component, and further comprises, at a second end, a second connecting component comprising radial teeth substantially equally spaced along a surface of the at least one intermediate component and suitable for engaging radial teeth of the second cylindrical hollow component or of another intermediate component.

9. The apparatus of claim 6, further comprising a component for preventing accidental relative rotation between the first cylindrical hollow component, the second cylindrical hollow component, and the at least one intermediate component.

10. The apparatus of claim 2, wherein the first cylindrical hollow component comprises a flange for connection to the vacuum pump.

11. The apparatus of claim 2, wherein the first cylindrical hollow component is integral with the vacuum pump.

12. The apparatus of claim 2, wherein the second cylindrical hollow component comprises a flange for connection to the vacuum chamber.

13. The apparatus of claim 2, wherein the second cylindrical hollow component is integral with the vacuum chamber.

14. The apparatus of claim 2, wherein the first and second toroidal semi-seats of the first and second cylindrical hollow components each have a substantially semi-circular profile.

15. The apparatus of claim 2, wherein the first and second toroidal semi-seats of the first and second cylindrical hollow components each have a substantially "L"-shaped profile.

16. The apparatus of claim 2, wherein the compression force directed along the axis of symmetry has a magnitude greater than the predetermined threshold while the damper is under vacuum conditions.

* * * * *